United States Patent [19]

Miyake

[11] Patent Number: 5,029,248
[45] Date of Patent: Jul. 2, 1991

[54] ELECTROSTATIC CAPTURE TYPE RADON MEASURING APPARATUS

[75] Inventor: Hiroshi Miyake, Kobe, Japan

[73] Assignee: Okano Works Ltd., Osaka, Japan

[21] Appl. No.: 348,835

[22] Filed: May 8, 1989

[30] Foreign Application Priority Data

May 10, 1988 [JP] Japan ............................. 63-61961[U]

[51] Int. Cl.$^5$ .............................................. G01V 5/00
[52] U.S. Cl. .................................... 250/253; 250/255; 250/370.02; 250/393
[58] Field of Search ............... 250/482.1, 472.1, 473.1, 250/393, 370.02, 255, 253; 313/93

[56] References Cited

U.S. PATENT DOCUMENTS

| Re. 33,065 | 9/1989 | Alter et al. | 250/472.1 |
|---|---|---|---|
| 3,638,059 | 1/1972 | Taylor | 313/93 |
| 3,665,194 | 5/1972 | Alter et al. | 250/472.1 |
| 3,916,200 | 10/1975 | Sparks, Jr. et al. | 313/93 |
| 4,385,236 | 5/1983 | Hassib et al. | 250/473.1 |
| 4,417,142 | 11/1983 | Malmqvist et al. | 250/472.1 |
| 4,633,089 | 12/1986 | Wijangco | 313/93 |
| 4,778,992 | 10/1988 | Wheeler | 250/255 |
| 4,853,536 | 8/1989 | Dempsey et al. | 250/253 |
| 4,868,386 | 9/1989 | Ilmasti | 250/253 |

OTHER PUBLICATIONS

An Improved Time-Integerating Radon Monitor, A. J. Breslin and A. C. George, U.S. Dept. of Energy, Environmental Measurements Laboratory.

Primary Examiner—Edward P. Westin
Assistant Examiner—Kim-Kwok Chu
Attorney, Agent, or Firm—Armstrong, Nikaido, Marmelstein, Kubovcik & Murray

[57] ABSTRACT

Disclosed is an electrostatic capture type radon-measuring apparatus, which includes a supporting circular cylinder supported on a supporting table with an axis of the cylinder extending substantially vertically. A positive electrode has a curved surface extending convexly upward from the upper end of the supporting cylinder. A lower positive electrode of a truncated cone shape has open upper and lower ends and extends as narrowed downward from the upper end of the supporting cylinder. A negative electrode has an upper end thereof located in the vicinity of the lower end opening of the lower positive electrode. A solid track detector is covered with an electro-conductive thin film having α ray permeability and is mounted on the negative electrode. A cover is provided on the supporting table and encloses the supporting cylinder, upper and lower positive electrodes, negative electrode and solid track detector. The cover has an air-ventilating portion provided with a filter which does not permit the passage of daughter nuclides of radon and thoron.

3 Claims, 4 Drawing Sheets

ELECTROSTATIC CAPTURE TYPE RADON MEASURING APPARATUS

FIELD OF THE INVENTION

This invention relates to a radon measuring apparatus of the electrostatic capture type.

DESCRIPTION OF THE PRIOR ART

Recently attention is directed to the fact that among the exposures to environmental radiation, the exposure to radiation from radon and its daughter nuclides seriously affects the human body. In such a situation, various attempts have been made to measure the concentration of environmental radon.

For this measurement, solid track detectors have been increasingly used in recent years. The detectors of this type are adapted to receive the α ray emitted from radon daughter nuclides, followed by etching the detector surface and determining the concentration of radon on the basis of the number of the etch pits. Such detectors are used according to the following methods.

1. Direct Method

In this method, the detector is left to stand in the environment. The method has the advantage of being easy and convenient to carry out. Yet the ratio of the amount of the α ray from radon in the air and its daughter nuclides both having disintegrated to the amount of α ray from the daughter nuclides adhering to the detector surface widely varies depending on the environmental conditions such as humidity. Further disadvantage is that adverse effect results from thoron and its daughter nuclides. Consequently, this method is unreliable.

2. Cup Method

This method comprises sticking a detector to the inner bottom of a plastic cup, closing its opening with a filter to prevent the intrusion of the daughter nuclides of radon and thoron from outside, and detecting the amounts of α ray from radon and its daughter nuclides having disintegrated in the cup and on the side wall of the cup. This method has the advantages an apparatus of simple structure can be used and with a filter, the effect of the thoron having a short half life (0.55 sec) can be reduced to a negligibly low degree. However, this method entails the problem that a long time is required for the accumulation of tracks. Particularly the detector must be left to stand for several months or longer when used in a place of low radon concentration to obtain a high etch pit density so as to eliminate the possibility of confusion with the background flaws of the detector and the like.

3. Electrostatic Capture Method

This method is intended to electrostatically catch the daughter nuclides of radon on a detector. The detector for use in this method is covered with an electro-conductive film and positioned on an electrode, and a negative voltage is applied to the vessel wall surrounding the detector. Usually the daughter nuclides of radon such as RaA (Po-218) and RaC' (PO-214) produced by the decay of radon are charged positively immediately after the decay. Utilizing this phenomenon, this method is carried out. In method the detector is placed in front of the negative electrode to achieve effective accumulation of tracks on the detector by the radiation from the RaA adhering concentratively to the negative electrode.

An example of conventional apparatus to be used for this purpose is shown in FIG. 2. In the illustrated apparatus, the upper opening of the positive electrode 1' of the bottomed circular cylinder type is closed with a cover 2', and a negative electrode 3' is hung from this cover. Voltage is applied to both electrodes using a battery. The negative electrode 3' is of circular cylinder shape and has an open lower end as shown in FIG. 3. A detector 4' is attached to the lower surface of its top wall. Its open lower end opening is closed with a Mylar film 5' to which aluminum is vapor-deposited. Vent holes are provided on the side wall of the cylindrical positive electrode 1'. At the vent holes, filters 6' are installed for spontaneous circulation of air impregnated with only radon, preventing the daughter nuclides of radon and thoron from passing therethrough. Phosphorus pentoxide 7' is provided for drying on the bottom of the cylindrical positive electrode 1' as shown in FIG. 2. In use, the apparatus is left in the state shown in FIG. 2 at the place of measurement. Then, traces are formed on the detector due to the action of the α-ray emitted from the daughter nuclides of radon which were attracted by the negative electrode 3' and adhered on the Mylar film 5'. In a predetermined lapse of time after formation of traces, the detector is taken out and etched.

The apparatus for electrostatic capture can accomplish measurement using the radiation from the concentrated daughter nuclides of radon more efficiently than the other measuring methods as stated hereinbefore. Nevertheless the apparatus has the following problems.

It is known that generally in the atmosphere, the RaA ion due to the α disintegration of RaA and other ions move along the lines of electric force. This is shown in FIG. 5 in which a cylindrical collector similar to the apparatus of the type described above is used. In FIG. 5, the solid lines in a positive electrode chamber designate the lines of electric force, and the broken lines, equipotential lines. As apparent from FIG. 5, the daughter nuclides of radon reach a detector chiefly from the circumference of a cylindrical positive electrode chamber with the result that the density distribution of etch pits on the detector is low at the central part and high in its peripheral part, consequently assuming a circular ring shape. FIG. 7 shows the relation between the measurements in this distribution and the distance from the center of the detector. In this way, etch pits do not concentrate at the center of the detector and the counting of etch pits must be carried out over an extensive area of detector, taking much time and labor. Moreover, because etch pits are distributed over a wide area, the density of etch pits is lower and a lower effect is produced due to the background containing flaws in the detector and the tracks caused during storage, resulting in reduction of S/N ratio and thus in decrease of measurement accuracy.

SUMMARY OF THE INVENTION

An object of this invention is to resolve these problems of the conventional apparatus for conducting the electrostatic capture method.

More specifically, the object of this invention provides a radon-measuring apparatus of the electrostatic capture type capable of completing measurement in a short time with high accuracy.

The foregoing object of this invention can be accomplished by the radon-measuring apparatus of the electrostatic capture type, which comprises a supporting circular cylinder supported on a supporting table with the axis of cylinder extending substantially vertically; a positive electrode having a curved surface extending convexly upward from the upper end of the supporting cylinder; a lower positive electrode of truncated cone shape having open upper and lower ends and extending as narrowed downward from the upper end of the supporting cylinder; a negative electrode with the upper end thereof located in the vicinity of the lower end opening of the lower positive electrode; a solid track detector covered with an electro-conductive thin film having α ray permeability and mounted on the negative electrode; and a cover provided on the supporting table and enclosing the supporting cylinder, upper and lower positive electrodes, negative electrode and solid track detector, the cover having an air-ventilating portion provided with a filter which does not permit the passage of daughter nuclides of radon and thoron.

According to this invention, there is provided a radon-measuring apparatus of the electrostatic capture type which can produce the following effects. Stated more specifically, the apparatus is provided with the upper positive electrode having the curved surface extending convexly upward, the lower positive electrode of truncated cone shape extending continuously and narrowing downward from the lower part of the upper positive electrode, and the negative electrode with the upper end thereof located at the lower end opening of the lower positive electrode. This structure affords the following feature. In connection with the lines of electric force extending toward the negative electrode, the area divided by the lines of the electric force extending from the central upper part in the positive electrode chamber toward the central part of the negative electrode are larger than the area divided by the lines extending toward the negative electrode from the peripheral part in the positive electrode chamber. As the result, the daughter nuclides of radon in the central upper part of the positive electrode chamber concentrate on the central part of the negative electrode, resulting in a high density of etch pits at the central part of the detector 7. Accordingly, the counting of etch pits can be efficiently carried out at the central part of the detector in a short time and the effect of background decreases in this way, thereby improving the measurement accuracy.

This invention will be further clarified by the description of an embodiment with reference to the following accompanying drawings. This invention is not limited to the embodiment, but various modifications are possible without deviation from the scope of the claims.

DESCRIPTION OF THE PREFERRED EMBODIMENT

Figure 1:
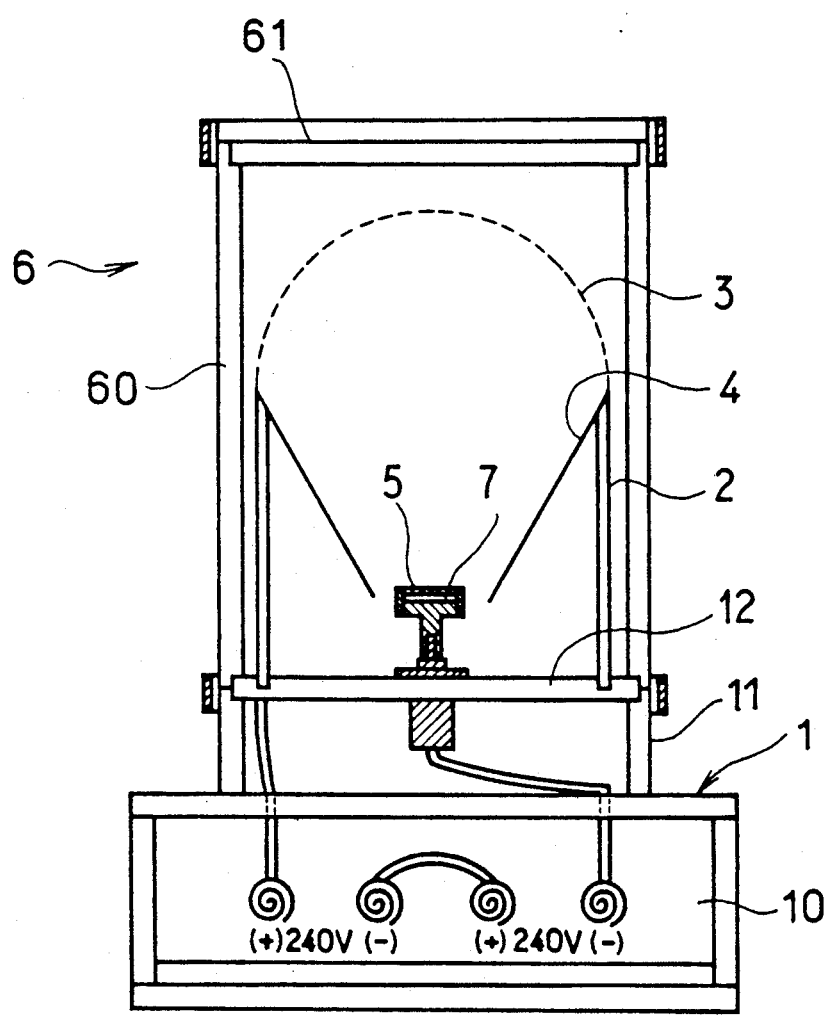
FIG. 1 is a longitudinal sectional front view showing an embodiment of radon-measuring apparatus of the electrostatic capture type according to this invention.
Figure 2:
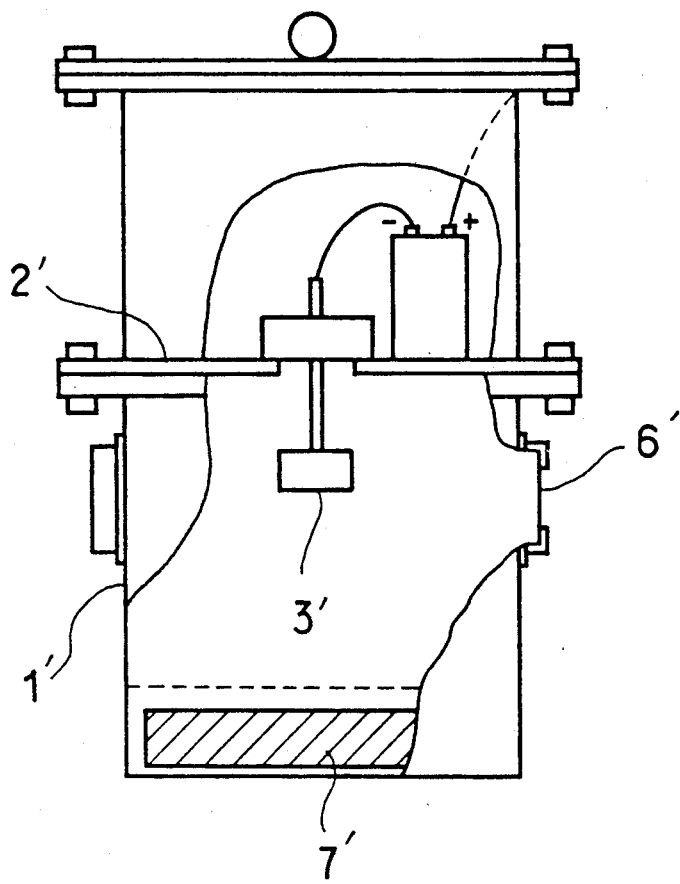
FIG. 2 is a partly sectional front view showing a conventional radon-measuring apparatus of the electrostatic capture type.
Figure 3:
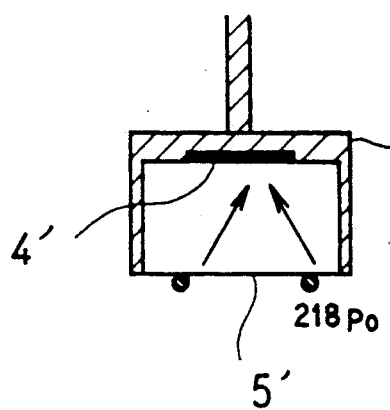
FIGS. 3 and 4 are longitudinal sectional front views showing the negative electrodes and detectors of the apparatus shown in FIG. 2 and FIG. 1, respectively.
Figure 4:
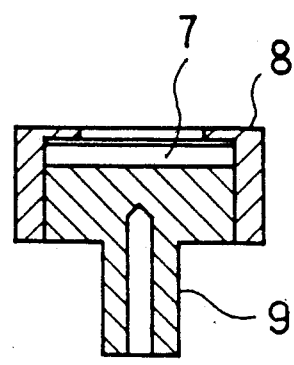
Figure 5:
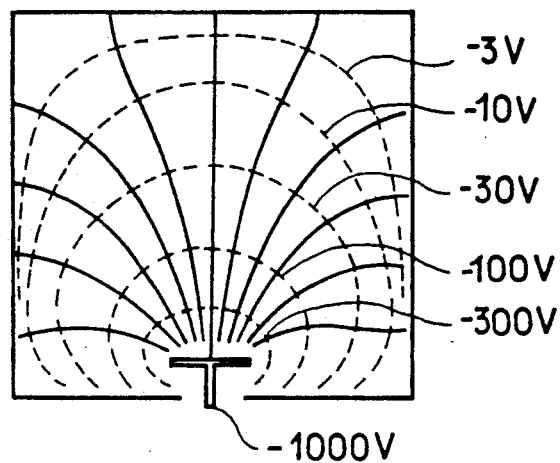
FIGS. 5 and 6 show the lines of electric force in a conventional apparatus and the apparatus shown in FIG. 1.

Referring to FIG. 1, the apparatus comprises a circular cylinder cover 6 supported on a supporting table 1, a supporting circular cylinder 2, positive electrodes 3 and 4, and a negative electrode 5. The cover 6 includes the members 2, 3, 4 and 5 arranged therein. The supporting table 1 has a power source member 10 accommodating therein batteries, a mounting member 11 of circular cylinder shape disposed on the member 10 and a supporting plate 12 which covers the top end of the mounting member 11. The cover 6 of circular cylinder shape is provided with a side wall 60 having the same diameter as that of the mounting member 11 and with a filter 61 detachably covering the upper opening of the side wall. The filter 61 has numerous pores that allow spontaneous ventilation of air without passing the daughter nuclides of radon and thoron therethrough. Only radon as an object of measurement is allowed to pass through the pores together with air. The filter is of the type commonly used for carrying out the conventional cup methods and electrostatic capture methods. The supporting circular cylinder 2 is accurately positioned on the supporting plate 12 having a circular groove. The positive electrode portion comprises a reticular upper positive electrode 3 with an upwardly convex semispherical surface and a lower positive electrode 4 having a funnel shape with open upper and lower ends and extending downward continuously from the lower end of the upper positive electrode 3. These lower edge of the upper positive electrode 3 and upper edge of the lower positive electrode 4 ar both supported with the supporting circular cylinder 2. At the center of the supporting plate 12, the negative electrode 5 is supported in such manner that the supporting plate is penetrated by the electrode 5. The upper end of the electrode 5 is located in the vicinity of the lower end opening of the lower positive electrode 4. As shown in FIG. 4, the negative electrode 5 is composed of a disk electrode 9 supported on a holding rod, and a cap 8 having a circular window between which a solid track detector 7 is disposed. With this arrangement, the detector can be easily mounted and detached, and the detector is held accurately at the specified position. Furthermore, the tracks of α ray on the detector are limited to the part of the circular window. When the detector surface area covered with the other part than the window part is observed in comparison with the detector surface area opposed to the window part, the value of background can be evaluated accurately. This solid track detector 7 is of the type commonly used for the detection of the tracks of α ray. Preferably usable as such detector are, for example, a sheet of aryldiglycol carbonate, a sheet of cellulose nitrate and sheets of other materials. These detectors, which are insulators, are covered with electro-conductive thin films having α ray permeability like a polyethylene film with aluminum vapor deposition, and is kept at the same potential as the negative electrode. The power source portion 10 lowers the center of gravity of the whole apparatus due to the weight of batteries, assuring stable standing of the apparatus free of a possibility of overturn.

The dimensions of the main parts of this apparatus are as follows.

| | |
|---|---|
| The inside diameters of the lower end of the | 80 mm |

| -continued | |
|---|---|
| upper positive electrode 3 and the upper end of the lower positive electrode 4 | |
| The height of the lower positive electrode 4 | 40 mm |
| The inside diameter of the lower end of the lower positive electrode 4 | 30 mm |
| The height from the upper surface of the supporting plate 12 to the upper surface of the negative electrode 5 | 20 mm |
| The outside diameter of the negative electrode 5 | 16 mm |
| The window diameter of the upper cap 8 of the negative electrode 5 | 8 mm |
| The thickness of the top wall of the upper cap 8 of the negative electrode 5 | 0.2 mm |

The above values are listed only by way of example and the dimensions can be varied as required.

In use, the detector 7 covered with an α ray permeable electro-conductive thin film is placed on the negative electrode 5 and the cover 6 is mounted on the supporting plate 12 in the environment to be measured. After voltage is applied and held for a predetermined time period, the detector 7 is taken out and etched. The detector 7 can be placed on the electrode 5 and can be withdrawn therefrom by detaching the cover 6 and the upper positive electrode 3. Electricity can be turned on or off easily and assuredly by fitting and detaching dry batteries.

Figure 6:
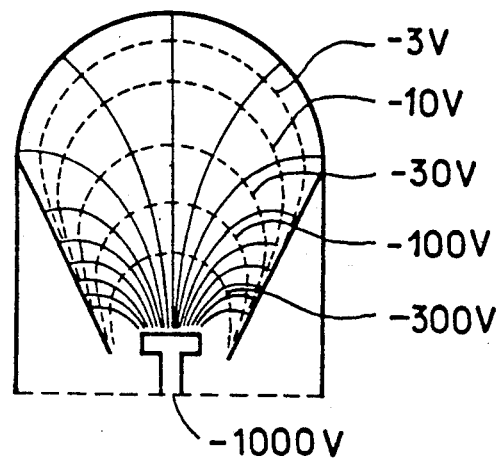
Figure 7:
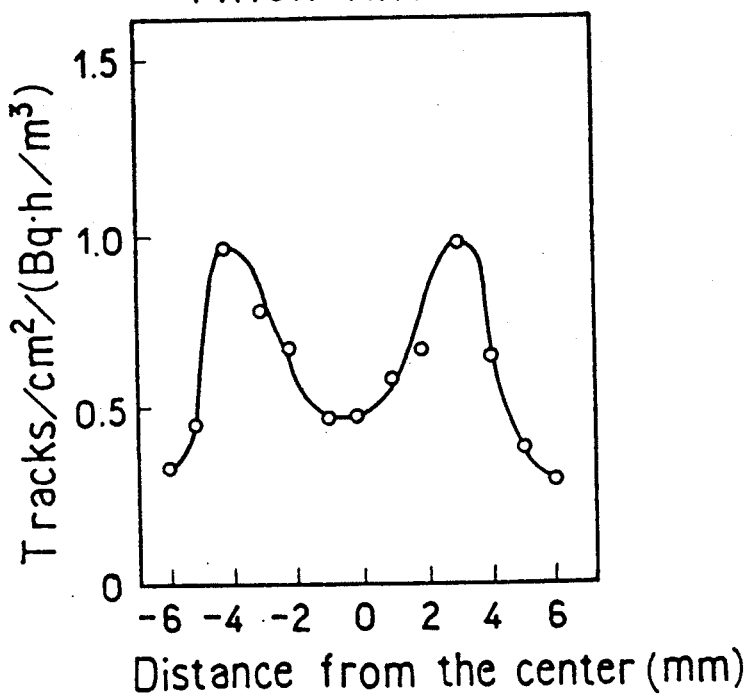
FIGS. 7 and FIG. 8 are graphs showing the distribution of etch pit density in the detectors of a conventional apparatus and the apparatus shown in FIG. 1.
Figure 8:
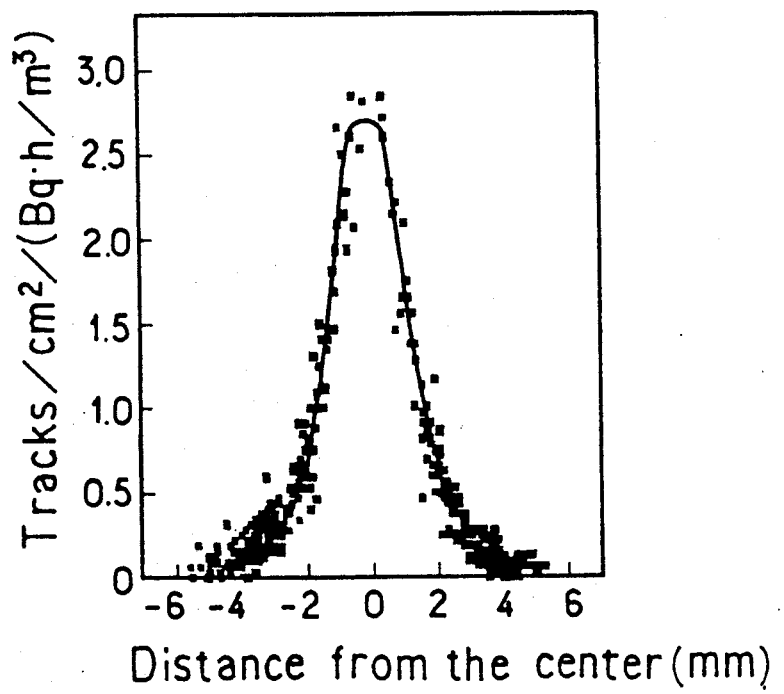

This apparatus can give the following results. The lines of electric force in the chamber enclosed with the positive electrodes 3 and 4 take the form as shown in FIG. 6. Namely, among the lines of electric force running toward the negative electrode, the lines thereof extending from the upper part of the positive electrode chamber toward the central part of the negative electrode have a density increased more than the lines extending toward the negative electrode from the peripheral part of the positive electrode chamber. Accordingly the RaA in the upper part of the positive electrode chamber concentrates to the center of the negative electrode with the result that the density of etch pits at the central part of the detector 7 is particularly high. FIG. 8 is a graph showing the density of the etch pit on the detector 7 afforded by operating the apparatus. The graph clearly shows that the concentration at the central part of the detector has occurred in the state close to a Gauss distribution.

In the above embodiment, the upper positive electrode 3 and the lower positive electrode 4 have a semispherical shape and a funnel shape, respectively but can take other various shapes. The upper positive electrode can assume a suitable form having an upwardly convex curved surface, and the lower positive electrode can have an appropriate form extending as narrowed downward and having upper and lower open ends.

I claim:

1. An electrostatic capture type radon-measuring apparatus comprising:
   a supporting circular cylinder supported on a supporting table with an axis of the supporting circular cylinder extending substantially vertically;
   an upper positive electrode having a curved surface extending convexly upward from an upper end of the supporting circular cylinder;
   a lower positive electrode of a truncated cone shape having open upper and lower ends and extending as narrowed downward from the upper end of the supporting circular cylinder; p1 a negative electrode with an upper end thereof located in a vicinity of the lower end opening of the lower positive electrode;
   a solid track detector covered with an electro-conductive thin film having α ray permeability and mounted on the negative electrode; and
   a cover provided on the supporting table and enclosing the supporting circular cylinder, upper and lower positive electrodes, negative electrode and solid track detector, the cover having an air-ventilating portion provided with a filter which does not permit passage of daughter nuclides of radon and thoron.

2. An electrostatic capture type radon-measuring apparatus according to claim 1 in which the upper positive electrode has a semispherical shape.

3. An electrostatic capture type radon-measuring apparatus according to claim 1 in which the lower positive electrode has a funnel shape.

* * * * *